(12) United States Patent
Reeves et al.

(10) Patent No.: US 6,444,073 B1
(45) Date of Patent: Sep. 3, 2002

(54) THERMOPLASTIC MULTI-LAYER COMPOSITE STRUCTURE

(75) Inventors: Charlie Reeves, Merritt Island, FL (US); Stephen Crane, Stanwood, WA (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/288,429

(22) Filed: Apr. 8, 1999

Related U.S. Application Data

(63) Continuation of application No. 08/846,143, filed on Apr. 25, 1997, now Pat. No. 5,916,672.

(51) Int. Cl.[7] .............................. B32B 31/00; B32B 3/26
(52) U.S. Cl. ...................... 156/211; 156/257; 156/268; 156/308.2; 156/244.11; 52/309.8; 52/309.9; 52/309.4; 52/746.1
(58) Field of Search ................................ 156/211, 257, 156/268, 308.2, 244.11; 52/309.8, 309.9, 309.11, 746.1; 428/304.4, 319.9, 316.6, 71

(56) References Cited

U.S. PATENT DOCUMENTS

| | | | |
|---|---|---|---|
| 4,032,689 A | * 6/1977 | Johnson et al. | 428/55 |
| 4,910,067 A | * 3/1990 | O'Neill | 428/139 |
| 4,952,453 A | * 8/1990 | Uchida | 428/364 |
| 5,257,594 A | * 11/1993 | Methven | 114/354 |
| 5,834,082 A | * 11/1998 | Day | 428/56 |

OTHER PUBLICATIONS

Webster's II New Riverside University Dictionary, p. 75, 1984.*

* cited by examiner

*Primary Examiner*—Linda Gray
(74) *Attorney, Agent, or Firm*—Fitch, Even, Tabin & Flannery

(57) ABSTRACT

A thermoplastic multi-layer composite structure is disclosed and consist in a first embodiment of a co-extruded, acrylic polypropylene outer skin and high melt strength polypropylene substrate which is attached to a first surface of a polypropylene foam core. An inner polypropylene skin can be provided and is attached to a second surface of the foam core. The foam core can either be constructed from an expanded polypropylene or an extruded polypropylene. Where an expanded polypropylene foam core is provided, the foam core is attached to the outer and inner skin through the use of a polypropylene adhesive. Where the extruded polypropylene foam core is provided, the skins can be attached to the foam core through a welding or bonding process in lieu of adhesives. The polypropylene adhesives can also be utilized for attaching the skins to the extruded foam core. Additionally, the extruded foam core can vary in density to provide a composite foam core. Preferably, the various densities of the composite foam core are arranged such that the lowest density foam is provided at the center of the core and the varying densities of the foam core extend outward from the center in numerical order.

22 Claims, 3 Drawing Sheets

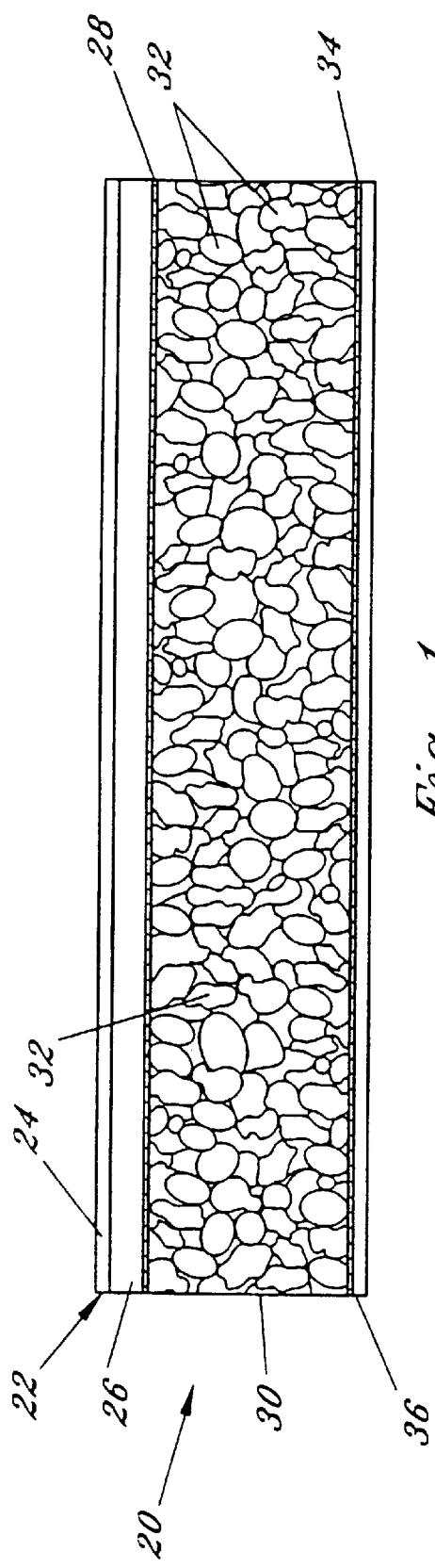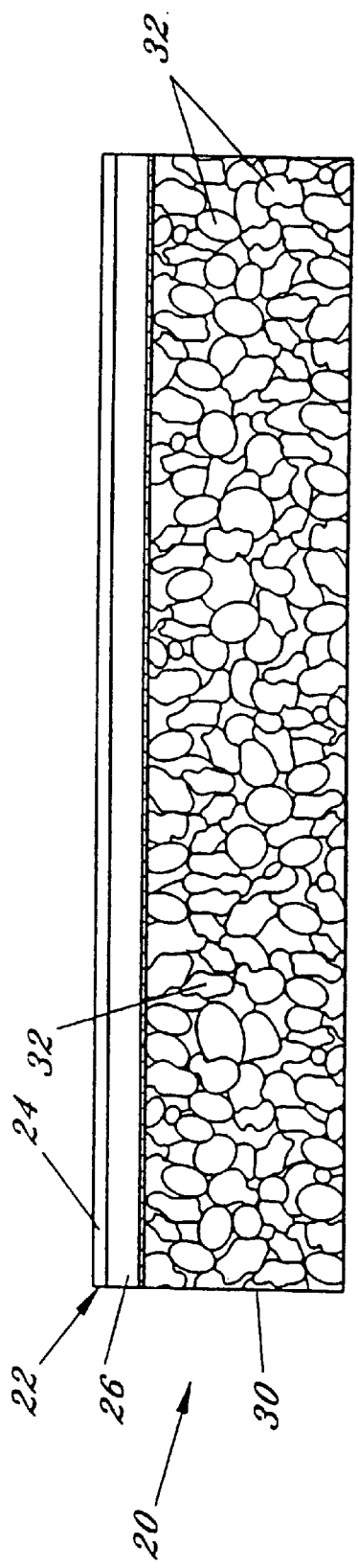

THERMOPLASTIC MULTI-LAYER COMPOSITE STRUCTURE

This application is a continuation of U.S. patent application Ser. No. 08/846,143, filed Apr. 25, 1997, now U.S. Pat. No. 5,916,672.

BACKGROUND OF THE INVENTION

1. Field of the Invention

The present invention relates generally to thermoplastic composite materials and more particularly to a thermoplastic multi-layer composite structure.

2. Description of the Prior Art

Thermoplastic composite materials are well known and used in various industries including the marine industry. Recently, with the movement towards improving the environment, several regulations, treaties and laws have been passed to help protect the environment.

Currently, in the marine industry, as well as numerous other industries, the use of fiberglass as a construction material is highly prevalent. Fiberglass is defined as a material consisting of extremely fine filaments of glass which can be embedded in various resins to make boat hulls, fishing rods, and the like. The fine filaments of glass can also be combined in yarn and woven into fabrics or used in masses as a thermal and acoustical insulator. Fiberglass wool, a thick, fluffy material made from discontinuous fibers, is used for thermal insulation and sound absorption. The fiberglass wool is often found in ship and submarine bulkheads and hulls, as well as automobile engine compartments and body panel liners.

The major ingredients of fiberglass include silica sand, limestone, and soda ash. The silica sand is used as the glass former, and the limestone and soda ash are provided primarily to lower the melting temperatures. Other ingredients can also be utilized and are usually provided to improve certain properties such as chemical resistance. When creating fiberglass the raw materials are carefully weighted in exact quantities and thoroughly mixed together before being melted into glass.

Once prepared, the mixed materials are fed into a furnace for melting. The temperature of the furnace is precisely controlled to assure a smooth, steady flow of glass. To form into fiber, the molten glass is kept at a temperature of approximately twenty-five hundred (2500° F.) degrees fahrenheit. Once the glass becomes molten, it is transferred by a channel disposed at the end of the furnace to the forming equipment.

The type of fiber desired determines which process is utilized to form the fiber. Textile fibers can be formed from the molten glass directly from the furnace. Alternatively, the molten glass can be fed first to a machine that forms glass marbles which can be inspected visually for impurities. The glass or glass marbles are then fed through spinnerets which are heated bushings, to allow the molten glass to pass through its numerous orifices and come out as fine filaments.

To produce a long, continuous fiber, multiple strands of the glass which passes through the orifices of the spinneret, are caught up on a high-speed winder. The winder revolves at a much faster rate that the rate of flow of the molten glass out of the orifices. The tension pulls out the filaments while still molten, to form strands a fraction of the diameter of the orifices. A chemical binder can be applied to help prevent the fibers from breaking. The filaments are then wound upon tubes where they can be twisted and plied into yarn.

Another process in known as the staple-fiber process wherein as the molten glass flows through the bushing, jets of air rapidly cool the filaments. The air also breaks the filaments into certain lengths. The broken filaments fall through a spray of lubricant onto a revolving drum, where they form a thin web. The web is pulled from the drum and sent into a continuous strand of loosely assembled fibers. The strand can then be made into yarn as described above.

Instead of forming the filaments into yarn, the strands may be chopped into short lengths. The chopped fiber is formed into mats and a binder is provided. After curing in an oven, the mat is rolled up.

To make a glass wool, the molten glass flows from the furnace into a rapidly spinning cylindrical container having small holes. The spinning of the container, allows horizontal streams of glass to flow out of the holes. The streams of molten glass are converted into fibers by a downward blast of air or hot gas. The fibers fall onto a conveyor belt, where they interlace with each other in a fleecy mass which can be used as insulation. Alternatively, the wool can be sprayed with a binder, compressed to a desired thickness and cured in an oven. The heat from the oven fixes the binder, and the end product may be a rigid or semi-rigid board.

In addition to binders, other coatings may also be required for fiberglass products. For example, lubricants can be utilized to reduce fiber abrasion. The lubricant is directly sprayed on the fiber or added into the binder. Furthermore, an anti-static composition can be sprayed onto the surface of fiberglass insulation mats during cooling. The anti-static composition usually is provided to minimize static electricity and to act as corrosion inhibitor and stabilizer. Additionally, coupling agents can be provided on the strands, when the strands are utilized for reinforcing plastics, to strengthen the bond to the reinforced material.

As seen from the above description, the manufacture of products using fiberglass as a primary component is relatively expensive and labor intensive. Furthermore, fiberglass does not have good energy absorbing characteristics, which causes nearly all of the impact forces to be translated through the fiberglass.

Furthermore, where a boat is constructed from wood or fiberglass, virtually all of the wave slap energy or wave impact energy from the bottom of the boat is translated through to the deck where the driver and/or passengers are positioned. Thus, hardly any, if any, of the energy from the waves is absorbed by the fiberglass. In view of the translation of all of the wave energy, in certain conditions the passengers and driver on the boat may experience an unpleasant boat ride.

As an alternative to fiberglass, various industries having also looked to the use of polyurethanes. Products utilizing polyurethanes include, but are not limited to, camper tops and coolers. In one process utilizing polyurethanes, a shell member constituting inner and outer skins is formed by conventional methods such as thermoforming. To provide for insulation and rigidity, a foaming process is performed wherein the polyurethane material is injected or disposed between the skins. However, under pressure the injected foam expands. As the outer and inner skins are not strong enough to resist the expanding foam, foam fixtures are provided to keep the skins in place and, thus, to prevent the skins from blowing out. Other methods used with polyurethane include the rotomold method and the twin sheet thermoforming method.

U.S. Pat. No. 4,910,067 issued to O'Neill discloses a thermoplastic/foam core/fiber-reinforced resin structural composite material. This composite structure consists of a thermoplastic layer, a layer of fibrous material spaced from the thermoplastic layer and a foam core disposed in the space between the layers. A resin impregnates and holds the layer of fibrous material together to form a fiber-reinforced resin structure. The thermoplastic layer consists of an acrylic ABS and utilizes a foamable urethane resin as its core material. In manufacturing the acrylic ABS layer is vacuumformed to its intended shape. The urethane foam is manufactured through injecting molding techniques.

As seen from the above description the forming processes required when utilizing polyurethane or urethanes are relatively involved and costly. In at least some of the above describe processes no bonding of the foam core to the outer skins occurs. Furthermore, the end product constructed from polyurethane have several drawbacks as they are normally less durable and are normally not recyclable. Furthermore, polyurethanes are known to contain a great deal of toxicity.

Thus what is needed in the art is a composite material which can be utilized to replace or be substituted for fiberglass or other materials such as polyurethanes during the manufacture of products normally containing fiberglass or the other materials as a primary component. It is, therefore, to the effective resolution of the aforementioned problems and shortcomings that the present invention is directed.

SUMMARY OF THE INVENTION

The present invention provides for a thermoplastic multi-layer composite structure consisting in a first embodiment of a co-extruded acrylic polypropylene outer skin and high melt strength polypropylene substrate which is attached to a first surface of a polypropylene foam core. An inner polypropylene skin can be attached to a second surface of the foam core.

Polypropylene is a member of a family of plastics called olefins and is a crystalline structure. The high density polypropylene provides for a relatively hard and stiff surface. The polypropylene also provides for a high degree of recyclability.

The foam core can either be constructed from an expanded polypropylene or an extruded polypropylene. Where an expanded polypropylene foam core is provided, the foam core is attached to the outer and inner skin through the use of a polypropylene adhesive.

Where the extruded polypropylene foam core is provided, the skins can be attached to the foam core through a welding or bonding process in lieu of adhesives. However, it should be understood that the polypropylene adhesives can also be utilized for attaching the skins to the extruded foam core. Additionally, the extruded foam core can vary in density to provide a composite foam core. In construction, the density of the foam core is determined by the amount of air entrapped. The more expanded the cells of the core are, the lower the density of the polypropylene foam. To construct a composite polypropylene foam core of varying density, the various density foams are fused or bonded together, similar to the fusing of the extruded foam core to the outer and inner skins.

Preferably, the various densities of the composite foam core are arranged such that the lowest density foam is provided at the center of the core and the varying densities of the foam core extend outward from the center in numerical order (i.e. lowest density at center of foam core, highest density at outer surface of foam core).

Accordingly, it is an object of the present invention to provide a thermoplastic multi-layer composite structure which can replace fiberglass, composite structures containing polyurethane or similar structures for certain applications.

It is another object of the present invention to provide a thermoplastic multi-layer composite structure which provides superior impact strength as compared to fiberglass, composite structures containing polyurethane or similar structures.

It is still another object of the present invention to provide a thermoplastic multi-layer composite structure which is relatively cheaper in cost to construct as compared to fiberglass, composite structures containing polyurethane or similar structures.

It is even still another object of the present invention to provide a thermoplastic multi-layer composite structure which is generally one hundred (100%) percent recyclable.

It is yet another object of the present invention to provide a thermoplastic multi-layer composite structure which will absorb a relatively higher amount energy as compared to fiberglass, wood, composite structures containing polyurethane or similar structures.

It is yet still another object of the present invention to provide a thermoplastic multi-layer composite structure which requires less maintenance as compared to fiberglass, composite structures containing polyurethane or similar structures.

It is a further object of the present invention to provide a thermoplastic multi-layer composite structure which does not contain toxic materials.

In accordance with these and other objects which will become apparent hereinafter, the instant invention will now be described with particular reference to the accompanying drawings.

BRIEF DESCRIPTION OF THE DRAWINGS

The invention may be better understood by reference to the drawings in which:

FIG. 1 is a sectional view of a first embodiment of the thermoplastic multi-layered composite structure taught by the present invention;

FIG. 2 is a sectional view of the embodiment illustrated in FIG. 1 with the inner skin removed;

DESCRIPTION OF THE PREFERRED EMBODIMENTS

Figure 3:
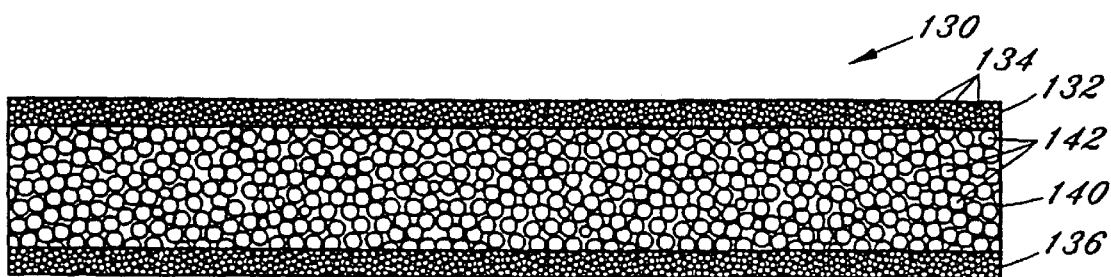
FIG. 3 is a sectional view of a multi-layered foam core as taught by the present invention.

FIGS. 1 and 2 illustrate a first embodiment of a thermoplastic multi-layered composite structure in accordance with the present invention with the composite structure being generally designated as reference numeral 20. Composite structure 20 generally includes a top skin 22 and a foam core 30. Where necessary for extra strength purposes an inner or back skin 36 can also be provided to help reduce fracturing of foam core 30. Back skin 36 can be vacuumformed during construction, however, such is not limiting.

In the preferred embodiment top skin 22 consist of an acrylic polypropylene outer layer 24 and a polypropylene substrate 26. An amorphous material can also be added to the acrylic polypropylene outer layer 24 to increase the impact strength of top skin 22. Preferably, substrate 26 has a high melt strength. Top skin 22, consisting of a weatherable acrylic polypropylene outer layer 24 and high melt strength substrate 26, can also be referred to as a cap sheet. Outer layer 24 provides a relatively hard and weatherable outer surface. Substrate 26 is provided as backing to outer layer 24 for cost purposes. Where cost considerations are not a concern top skin 22 can alternatively be constructed solely of acrylic polypropylene. Furthermore, top skin 22 can be constructed from a relatively high density polypropylene, with or without substrate 26, and without the acrylic component in outer layer 24. The density of outer layer 24 is preferably higher than the density of substrate 26. The high density polypropylene provides a hard and stiff surface, which for some uses of composite structure 20 may be sufficient without the need of an additional acrylic element or substrate 26. Preferably, top skin 22, consisting of outer layer 24 with or without substrate 26, is constructed by extrusion (outer layer 24 solely) or co-extrusion (outer layer 24 and substrate 26) procedures with top skin 22 being in the form of a planar sheet. When co-extruded, outer layer 24 and substrate 26 travel through a die where they are heated and fused together to form top skin 22. Preferably, outer layer 24 is relatively thin as compared to substrate 26.

Once constructed, top skin 22 is vacuumformed or thermoformed to its intended shape, assuming that the planar sheet form is not the intended shape. In one vacuumforming method, extruded or co-extruded top skin 22 is loaded on a clamp frame and rotated in a first oven station for heating (preheat) the planar sheet. The preheated sheet is placed in a second oven station, which causes the sheet to sag and become molten plastic. A mold of the intended shape is disposed below the sagging sheet. The sheet is lowered into the mold and a vacuum is applied through the base of the mold to suck the sheet about the mold. The pulled sheet takes the form of the mold. The shaped sheet is then allowed to cool and removed from the mold, to provide a top skin 22 in its intended shape.

In the first embodiment of the present invention (FIGS. 1 and 2), foam core 30 is constructed from an expanded polypropylene, which forms bead like cells 32. Foam core 30 has a first surface and a second surface. A hot melt spray polypropylene adhesive 28 is provided to allow top skin 22 to adhere or bond to the first surface of foam core 30. In lieu of polypropylene, adhesive 28 can be an epoxy.

As seen in FIG. 1, a bottom or back skin 36 can be attached or bonded to the second surface of foam core 30, preferably by a polypropylene adhesive 34 which can be the same as adhesive 28. Back skin 36 helps to prevent foam core 30 from cracking. Though not preferred, FIG. 2 illustrates composite structure 20 without a back skin 36, and thus also without adhesive 34. Preferably, top skin 22, foam core 30, back skin 36 and adhesives 28 and 34 are all polypropylene based to provide a one hundred (100%) percent recyclable composite structure 20.

Figure 4:
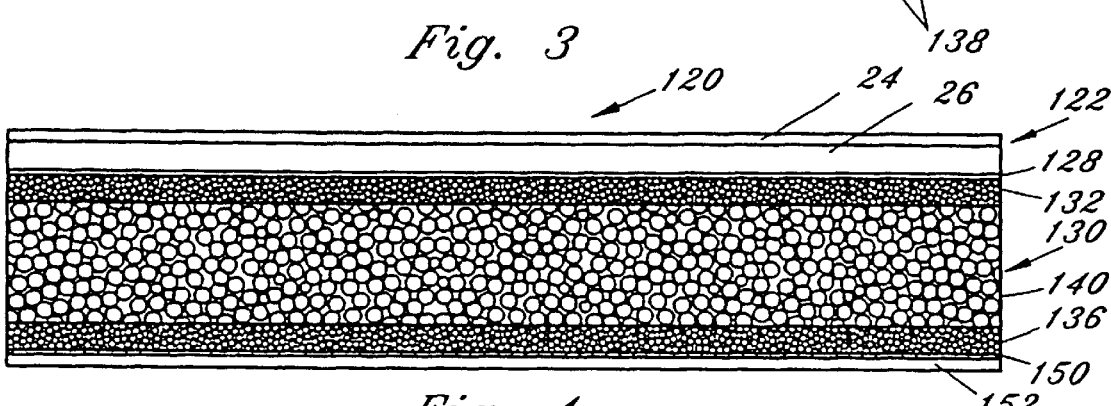
FIG. 4 is a sectional view of a second embodiment of the thermoplastic multi-layered composite structure taught by the present invention.
Figure 5:
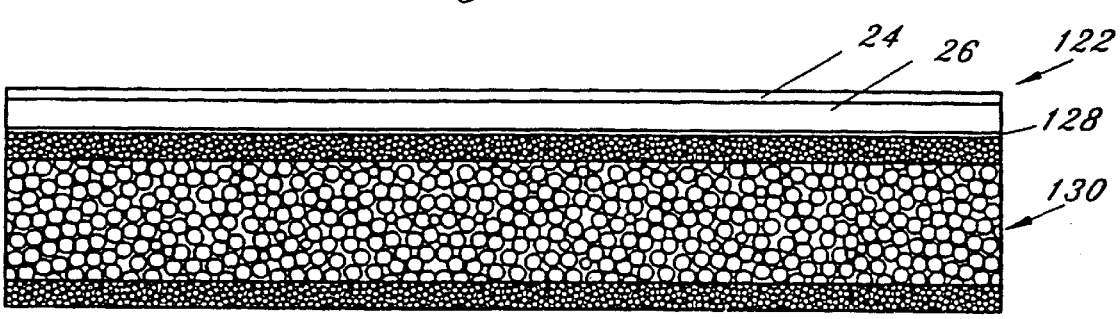
FIG. 5 is a sectional view of the embodiment illustrated in FIG. 4 with the inner skin removed.
Figure 7:
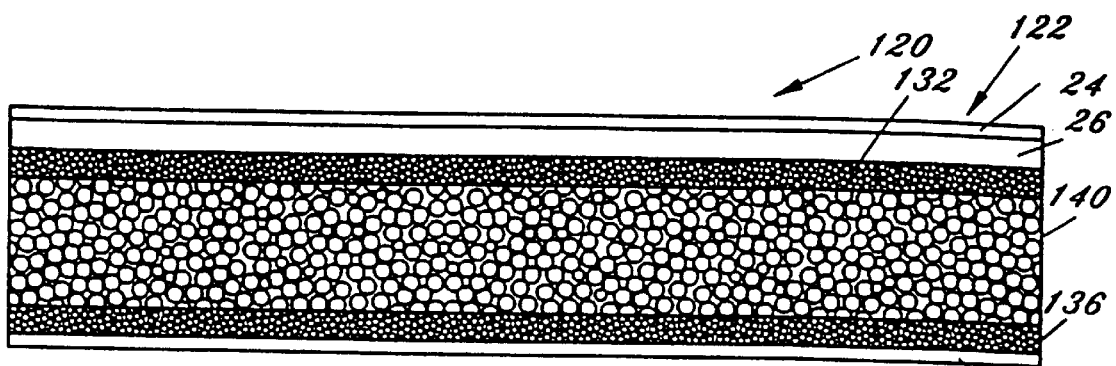
FIG. 7 is a sectional view of an alternative second embodiment of the present invention wherein a welding or bonding process is utilized to attach the outer and inner skins to the extruded foam core rather than adhesives.
Figure 8:
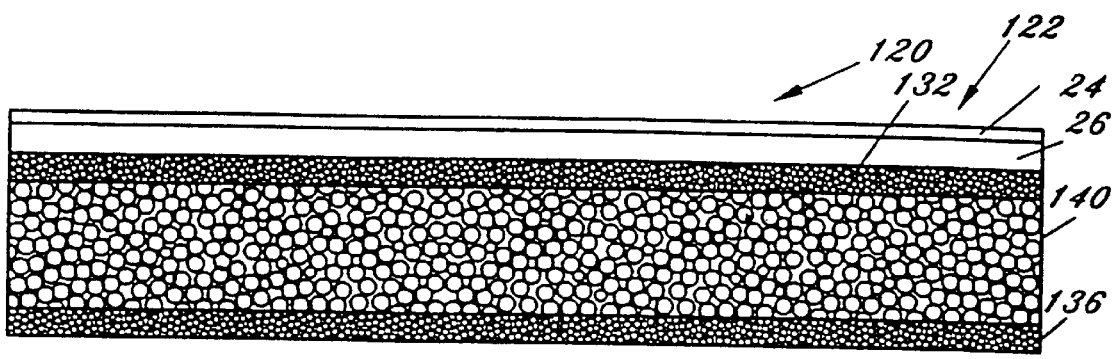
FIG. 8 is a sectional view of the embodiment shown in FIG. 7 with the inner skin removed.

FIG. 3 illustrates a multi-layer extruded polypropylene foam core 130. Top skin 122 and/or back skin 152 can be attached to foam core 130 through a welding or bonding process in lieu of adhesives (See FIG. 7 and 8). FIG. 7 illustrates top skin 122 and the back or inner skin 152 both attached to foam core 130 by fusing or bonding, while in FIG. 8 only a top skin 122 is provided and fused with foam core 130. However, it should be understood that the polypropylene adhesives 128 and 150 can also be utilized for attaching skins 122 and 152, respectively, to extruded foam core 130 (See FIGS. 4 and 5). Adhesives 128 and 150 are similar to adhesives 28 and 34 discussed above for the first embodiment of the present invention.

Extruded foam core 130, preferably, varies in density to provide a composite foam core 130. The density of each layer which forms foam core 130 is determined by the amount of air which was entrapped within the specific layer during its construction. The more expanded the cells of the layer are, the lower the density of such layer. To construct a composite polypropylene foam core, such as foam core 130, of varying densities, the multiple density foam layers are fused or bonded together, similar to the fusing or bonding of extruded foam core 130 to top skin 122 and back skin 152.

Preferably, the various densities of the composite foam core 130 are arranged such that the lowest density foam layer is provided at the center of composite core 130 and the varying density foam layers of core 130 are fused together and extend outward from the center in numerical order (i.e. lowest density layer at center of foam core 130, highest density layer at outer surface of foam core). As seen in FIG. 3, outer foam layers 132 and 136 are of a higher density as compared to the density of middle layer 140.

Foam core 130 is shown of consisting of three foam layers fused together to form a composite extruded polypropylene foam core 130. However, it should be understood that the present invention is not limited to a composite foam core consisting of three layers and any number of layers may be utilized, as may be necessary and are considered within the scope of the invention.

As seen in FIG. 3, as the density for the foam layers gets higher the cells are brought closer together, i.e. compare extruded cells 134 of outer layer 132 and cells 138 of outer layer 136 with cells 142 of middle layer 140. Each layer of foam core 130 is preferably constructed from of an extruded polypropylene. The desired thickness for foam core 130 is achieved by the fusing of a plurality of layers necessary to reach the chosen thickness value.

Figure 6:
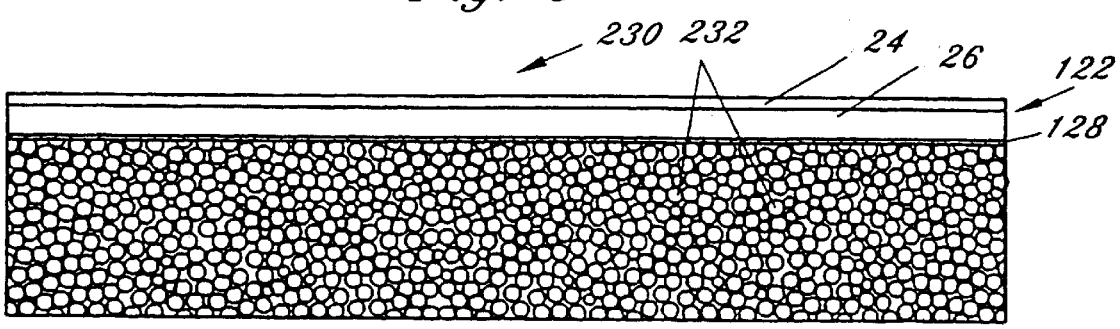
FIG. 6 is a sectional view of a third embodiment of the thermoplastic multi-layered composite structure taught by the present invention shown without an inner skin.

FIG. 6 illustrates an extruded foam core 230 which consist of a single polypropylene layer having a consistent density throughout. as shown by cells 232. Though foam core 230 is shown only attached to top skin 122 by adhesive 128 it should be understood that foam core can also be attached to back skin 152 by a polypropylene adhesive. Furthermore, foam core 230 can also be fused or bonded to top skin 122 or back skin 152 similar to the described above for foam core 130. Accordingly, though not preferred, a single layer extruded foam core 230 can be substituted for multi-layer composite foam core 130 in appropriate circumstances.

Preferably, in all embodiments, the densities of top skin 122 and back skin 152 are relatively higher than the density of foam core 230. As to foam core 130, the densities of top skin 122 and back skin 152 are relatively higher than the densities of outer layers 132 and 134 of foam core 130, which in turn are relatively higher than middle layer 140 of foam core 130. Providing higher density outer skins and a low density core 30, 130 or 230, helps to reduce costs, while providing desired mechanical properties, such as a high shear gradient between the center and outside of the material. Top skin 122 and back skin 152 are constructed similar to top skin 22 and back skin 36 discussed for the first embodiment of the present invention.

Figure 9:
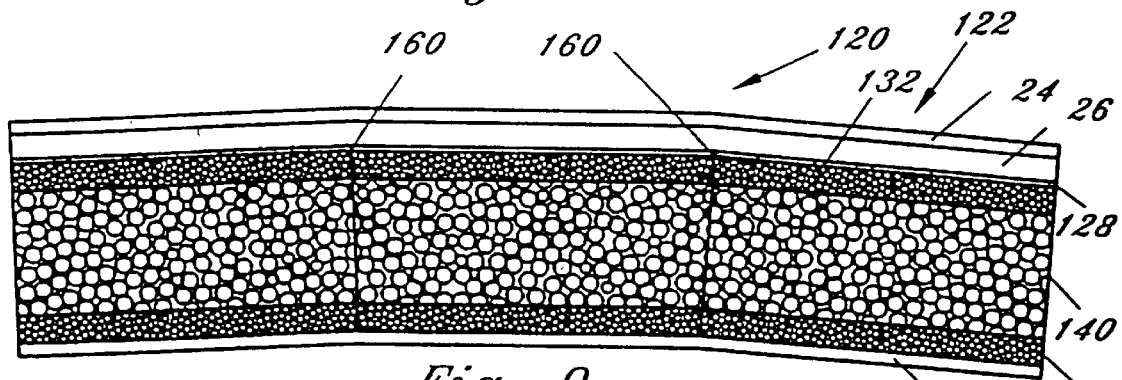
FIG. 9 is a sectional view of a further alternative second embodiment of the present invention having slits through the foam core for shaping.
Figure 10:
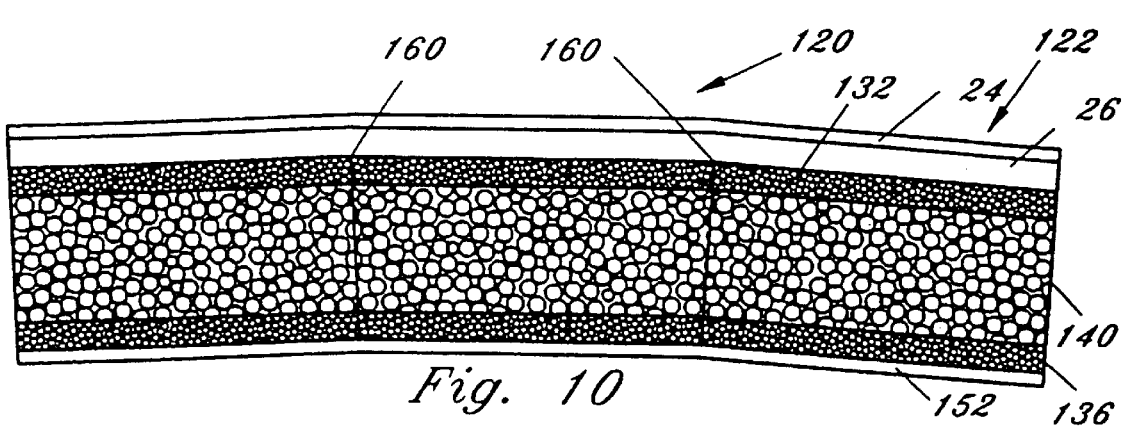
FIG. 10 is a sectional view of another alternative second embodiment of the present invention having slits through the foam core for shaping.

As seen in FIGS. 9 and 10, top skin 122 is shown slightly bowed as a desired shape. To have foam core 130 correspond to the shape of top skin 122, slits or cuts 160 are provided through foam core 130 at selected or random intervals. Preferably, back skin 152 is attached to foam core 130, as discussed above, prior to providing slits 160, in order to keep foam core 130 together. After slits 160 have been provided, foam core 130 and back skin 152 can be bowed to correspond to the shape of top skin 122. Once foam core 130 is bowed or bent to its desired shape it is attached to top skin 122 either by adhesives 128 (FIG. 9) or fusing (FIG. 10), similar to the embodiments described above.

As the entire composite structure 20 or 120 is primarily constructed from polypropylene, the composite is one hundred (100%) recyclable and eliminates concerns of toxicity. Furthermore, the present invention provides for a novel method of constructing composite structure 20 or 120. The present invention is also novel with respect to bonding or fusing a foam core to a weatherable polypropylene sheet, such as top skin 22 or 122. Thus, the present invention overcomes previous problems of bonding or fusing a foam core to a polypropylene sheet.

Composite structure 20 or 120 can be utilized as a replacement to fiberglass and other materials in many applications, including, but not limited to, boat hulls and decks, camper tops, coolers, etc. Furthermore, composite structure 20 or 120 absorbs a relatively higher amount of energy as compared to other materials such as fiberglass or wood. Substituting composite structure 20 or 120 for the wood or fiberglass, allows composite structure 20 or 120 to absorb fifty (50%) to sixty (60%) percent of the wave slap and impact energy, to thereby provide a relatively more comfortable and smooth boat ride. The use of composite structure 20 or 120 also reduces the amount of maintenance necessary as compared to fiberglass and improves durability. Structure 20 or 120 also has better long term cosmetically as compared to fiberglass. In addition to fiberglass and wood, structure 20 or 120 can also be utilized as a replacement for composite structures containing polyurethane or similar structures.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for forming a thermoplastic multi-layer composite structure, said method comprising the steps of:
   (a) providing a layer of extruded acrylic polypropylene;
   (b) providing a foam core; and
   (c) attaching said layer of extruded acrylic polypropylene to said foam core.

2. The method of claim 1 wherein step (c) comprises the step of fusing said foam core to said layer of extruded acrylic polypropylene.

3. The method of claim 1 wherein step (c) comprises the step of providing a substrate member and attaching said substrate to said layer of acrylic polypropylene and to said foam core.

4. A method for forming a thermoplastic multi-layer composite structure, and method comprising:
   (a) providing a layer of extruded acrylic polypropylene;
   (b) providing a foam core; and
   (c) attaching said layer of extruded acrylic polypropylene to only a portion of said foam core by spraying an adhesive to a surface of the layer of extruded acrylic polypropylene and mating said portion of said foam core to the surface of said layer of extruded polypropylene sprayed with said adhesive.

5. A method for forming a thermoplastic multi-layer composite structure, said method comprising:
   (a) providing a layer of extruded acrylic polypropylene;
   (b) providing a foam core;
   (c) attaching said layer of extruded acrylic polypropylene to said foam core;
   (d) providing a layer of polypropylene; and
   (e) attaching said layer of polypropylene to said foam core.

6. The method of claim 5 wherein step (e) comprises the steps of:
   spraying an adhesive to a surface of the layer of polypropylene; and
   mating said foam core to the surface of said layer of polypropylene sprayed with said adhesive.

7. The method of claim 5 wherein step (e) comprises the step of fusing said layer of polypropylene to said foam core.

8. The method of claim 5 further comprising the step of providing one or more slits through said foam core.

9. A method for forming a thermoplastic multi-layer composite structure, said method comprising:
   (a) providing a layer of extruded acrylic polypropylene;
   (b) providing a foam core constructed from polypropylene; and
   (c) attaching said layer of extruded acrylic polypropylene to said layer of extruded acrylic polypropylene.

10. A method for forming a thermoplastic multi-layer composite structure, said method comprising the steps of:
    (a) providing a layer of extruded acrylic polypropylene;
    (b) providing a foam core; and
    (c) attaching said foam core to at least a portion said layer of extruded acrylic polypropylene.

11. The method of claim 10 wherein step (c) comprises the step of fusing said foam core to at least a portion of said layer of extruded acrylic polypropylene.

12. The method of claim 10 wherein step (c) comprises the step of providing a substrate member and attaching said substrate to at least a portion of said layer of acrylic polypropylene and attaching said foam core to at least a portion of said substrate member.

13. A method for forming a thermoplastic multi-layer composite structure, said method comprising the steps of:
    (a) providing a layer of extruded acrylic polypropylene;
    (b) providing a foam core comprised of polyproypylene; and
    (c) attaching said foam core to at least a portion of said layer of extruded acrylic polypropylene.

14. A method for forming a thermoplastic multi-layer composite structure, said method comprising:
    (a) providing a layer of extruded acrylic polypropylene;
    (b) providing a foam core; and
    (c) spraying an adhesive to at least a portion of a surface of the layer of extruded acrylic polypropylene, and mating said foam core to at least a portion of the surface of said layer of extruded polypropylene sprayed with said adhesive.

15. A method for forming a thermoplastic multi-layer composite structure, said method comprising:

(a) providing a layer of extruded acrylic polypropylene;

(b) providing a foam core;

(c) attaching said foam core to at least a portion of said layer of extruded acrylic polypropylene;

(d) providing a layer of polypropylene; and (e) attaching said layer of polypropylene to at least a portion of said foam core.

16. The method of claim 15 wherein step (e) comprises the steps of:

spraying an adhesive to a surface of the layer of polypropylene; and mating said foam core to the surface of said layer of polypropylene sprayed with said adhesive.

17. The method of claim 15 wherein step (e) comprises the step of fusing said layer of polypropylene to at least a portion of said foam core.

18. The method of claim 15 further comprising the step of providing one or more slits through said foam core.

19. A method for forming a thermoplastic multi-layer composite structure, said method comprising the steps of:

(a) providing a layer of extruded acrylic polypropylene;

(b) providing a foam core; and (c) attaching said foam core to a portion of said layer of extruded acrylic polypropylene.

20. A method for forming a thermoplastic multi-layer composite structure, and method comprising:

(a) providing a layer of extruded acrylic polypropylene;

(b) providing a foam core;

(c) attaching said foam core to only a portion of said layer of extruded acrylic polypropylene;

(d) providing a layer of polypropylene; and (e) attaching said layer of polypropylene to only a portion of said foam core.

21. A method for forming a thermoplastic multi-layer composite structure, said method comprising the steps of:

(a) providing a layer of extruded acrylic polypropylene;

(b) providing a polypropylene substrate;

(c) attaching said polypropylene substrate to said layer of extruded acrylic polypropylene;

(c) providing a polypropylene foam core;

(d) attaching said polypropylene foam core to said polypropylene substrate;

(e) providing a layer of polypropylene; and (f) attaching said layer of polypropylene to said polypropylene foam core.

22. The method of claim 21 further comprising the step of providing one or more slits through said polypropylene foam core.

* * * * *